United States Patent
Hoxha et al.

(10) Patent No.: US 9,255,006 B2
(45) Date of Patent: Feb. 9, 2016

(54) METHOD FOR PRODUCING PHOSPHORIC ACID

(75) Inventors: Antoine Hoxha, Neuville-en-condroz (BE); Dorina Fati, Neuville-en-condroz (BE)

(73) Assignee: PRAYON TECHNOLOGIES, Engis (BE)

( * ) Notice: Subject to any disclaimer, the term of this patent is extended or adjusted under 35 U.S.C. 154(b) by 209 days.

(21) Appl. No.: 13/513,486

(22) PCT Filed: Dec. 2, 2010

(86) PCT No.: PCT/EP2010/068709
§ 371 (c)(1),
(2), (4) Date: Aug. 20, 2012

(87) PCT Pub. No.: WO2011/067321
PCT Pub. Date: Jun. 9, 2011

(65) Prior Publication Data
US 2013/0004403 A1    Jan. 3, 2013

(30) Foreign Application Priority Data
Dec. 2, 2009    (BE) .................................. 2009/0740

(51) Int. Cl.
*C01B 25/231*    (2006.01)
*C01B 25/228*    (2006.01)

(52) U.S. Cl.
CPC ............. *C01B 25/231* (2013.01); *C01B 25/228* (2013.01)

(58) Field of Classification Search
CPC ....................................... C01B 25/222–25/232
See application file for complete search history.

(56) References Cited

U.S. PATENT DOCUMENTS

| 3,523,754 A | 8/1970 | Yasutake et al. |
| 3,984,525 A | 10/1976 | Williams et al. |

(Continued)

FOREIGN PATENT DOCUMENTS

| CA | 915883 | 12/1972 |
| FR | 1485940 | 6/1967 |

(Continued)

OTHER PUBLICATIONS

Schrödter, K. et al: "Ullmann's Encyclopedia of Industrial Chemistry—Phosphoric Acid and Phosphates", Ullmann's Encyclopedia of Industrial Chemistry, 2008, pp. 1-48, XP002593034, Weinheim; Retrieved from the Internet: URL:http://mrw.interscience.wiley.com/emrw/9783527306732/ueic/article/a19_465/current/pdf [retrieved on Jul. 20, 2010]; cited in the application; p. 6, paragraph 1.2.2—p. 9, left-hand column, last paragraph.

European Patent Office International Search Report dated Jan. 25, 2011, for International Patent Application No. PCT/EP20101068709 (3 pages).

*Primary Examiner* — Anthony J Zimmer
*Assistant Examiner* — Justin Bova
(74) *Attorney, Agent, or Firm* — McCracken & Gillen LLC

(57) ABSTRACT

The invention relates to a method for producing phosphoric acid, including: attacking phosphate rock by means of sulfuric acid between 70° and 90° C. with formation of a first calcium sulfate dihydrate crystal slurry, the aqueous acid phase of said slurry having free $P_2O_5$ content between 38 and 50 wt % and free $SO_3$ content that is less than 0.5 wt % and greater than 0.05 wt %; converting said first slurry by means of heating at a temperature greater than 90° C., thus giving rise to a second slurry formed of calcium sulfate hemihydrate crystals; and, within the second slurry, separating a produced phosphoric acid, having a free $SO_3$ content that is less than 2%, and a calcium sulfate hemihydrate filter cake.

12 Claims, 2 Drawing Sheets

(56) References Cited

U.S. PATENT DOCUMENTS

| | | | |
|---|---|---|---|
| 4,196,172 A * | 4/1980 | Ore et al. | 423/157.4 |
| 4,588,570 A | 5/1986 | Davister et al. | |
| 4,777,027 A * | 10/1988 | Davister et al. | 423/320 |
| 5,009,873 A * | 4/1991 | Kerr et al. | 423/320 |

| | | |
|---|---|---|
| 2004/0047790 A1 | 3/2004 | Feng et al. |

FOREIGN PATENT DOCUMENTS

| | | |
|---|---|---|
| GB | 1164836 | 9/1969 |
| WO | WO 2005/118470 | 12/2005 |

* cited by examiner

METHOD FOR PRODUCING PHOSPHORIC ACID

The present invention relates to a method for producing phosphoric acid by attacking phosphate rock by means of sulfuric acid.

The conventional method of this type consists of reacting phosphate rock with sulfuric acid under conditions giving rise to crystallization of calcium sulfate dihydrate or gypsum ($CaSO_4.2H_2O$). The gypsum slurry obtained in a first reactor may then be subject, in a second reactor, to ripening allowing an enlargement of the sulfate grains formed, and this in order to increase filterability. The ripened slurry is then filtered with a phosphoric acid being obtained, having a free $P_2O_5$ content of the order of 25 to 35% by weight. The obtained gypsum still contains sufficient $P_2O_5$, either non-attacked or co-crystallized, i.e. fixed in the crystalline lattice of the gypsum. This limits the extraction yield of the $P_2O_5$ contained in the phosphate and makes gypsum unsuitable for certain applications.

Methods for producing phosphoric acid by attack with sulfuric add are &so known, giving, at higher $P_2O_5$ and/or $SO_3$ concentrations and temperatures, a calcium sulfate slurry in the form of a hemihydrate ($CaSO_4.\frac{1}{2}H_2O$) or of an anhydrite. These methods generally give concentrated phosphoric acid and a well-filterable sulfate, but the $P_2O_5$ extraction yield of these methods is less than the conventional method. In certain cases, after this attack, it is also proceeded with conversion of the obtained calcium sulfate hemihydrate into calcium sulfate dihydrate (cf. Schrëdter et al., Phosphoric Add and Phosphates, Ullman's Encyclopedia of Industrial Chemistry, 2008, pages 8 and 9).

Methods are also known, comprising triple crystallization of calcium sulfate first into a hemihydrate, and then into a dihydrate and finally again into a hemihydrate (cf. U.S. Pat. No. 4,588,570).

In order to improve the results of the conventional method, after separation of the production phosphoric add from the gypsum slurry, provision was made for mixing the remainder of the latter with concentrated sulfuric acid and optionally heating the whole, in order to convert the gypsum into calcium sulfate hemihydrate. The second thereby formed slurry is in turn filtered and the acid filtrate is recycled into the attack step (see FR 1485940). This method clearly increases the extraction $P_2O_5$ yield. Indeed, co-crystallized $P_2O_5$ in the gypsum during the attack is released during solubilization of the gypsum crystals, while calcium sulfate, recrystallized as hemihydrate, is very pure and extremely well-filterable. However this method requires two filtrations, i.e. two filters, whence an enormous size of the installation on an industrial scale.

According to an alternative of this method, after having applied the conditions of the conventional method for forming a gypsum slurry, provision was made for directly submitting the latter to mixing with sulfuric acid and optionally to heating, without therefore separating the production phosphoric acid beforehand. The hemihydrate slurry obtained is filtered, giving a very pure hemihydrate cake, but a filtrate formed by a mixture of phosphoric acid and sulfuric acid. In order to obtain quality production phosphoric acid, this mixture then has to be subject to a desulfatation installation, which therefore does not solve the bulkiness problems. Other methods for producing phosphoric acid very similar to the previous one are further known, comprising a conversion of dihydrate into hemihydrate and having the same drawbacks (GB-1,164,836; U.S. Pat. No. 3,984,525).

A method is finally known in which the phosphate rock is again subject to attack conditions of the conventional method in order to obtain a first slurry in which the formed gypsum has a grain size allowing filtration. A portion of this first slurry is then sampled and subject to conditions in which the gypsum is converted into hemihydrate, thereby forming a second slurry. The remainder of the first slurry is then mixed with the second and the whole is filtered (see WO 2005/118470).

The object of the present invention is to develop a method for producing phosphoric acid by attack of phosphate rock by means of sulfuric acid which improves the quality of the production phosphoric acid and the $P_2O_5$ extraction yield from this rock. This method should further be able to be easily applied in an existing conventional installation and therefore not require costly transformations and which cannot be justified in economic terms.

In order to solve these problems, a method for producing phosphoric acid is provided according to the invention, comprising an attack in an aqueous medium of phosphate rock by means of sulfuric acid at a first temperature comprised between 70 and 90° C., with formation of a first slurry of calcium sulfate dihydrate crystals in an acid aqueous phase, the acid aqueous phase of this slurry having a free $P_2O_5$ content comprised between 38 and 50% by weight and a free $SO_3$ content of less than 0.5% and greater than 0.05% by weight.

a conversion of this first slurry by heating to a temperature above 90° C., with solubilization of the calcium sulfate dihydrate crystals and recrystallization of the solubilized calcium sulfate giving rise to a second slurry formed of calcium sulfate hemihydrate crystals suspended in an aqueous phase based on phosphoric acid, and a separation in the second slurry between a production phosphoric acid, having a free $SO_3$ content of less than 2% and greater than 0.05% by weight, and a filtration cake based on calcium sulfate hemihydrate.

In the present patent application, it should be understood that the free phosphoric acid and free sulfuric acid contents are expressed in free $P_2O_5$ and in free $SO_3$.

In a quite unexpected way, as this will be explained subsequently, the method according to the invention gives rise during the attack step under the specified conditions to a dihydrate crystal slurry, while one skilled in the art would expect formation of hemihydrate. Dihydrate crystallization is not optimum, the crystals are small, they have a grain size having a $d_{50}$ of less than 20 μm. Such a slurry would have a very low filtration coefficient and it would therefore not be able to be industrially exploited in a process requiring its filtration. This aspect is however unimportant according to the invention since this first slurry is not intended to be filtered.

The attack conditions are such that they provide a substantially stoichiometric reaction between the sulfuric acid introduced and the calcium contained in the phosphate rock, mainly in the form of calcium carbonate and phosphate. The acid aqueous phase of this first slurry resulting from the attack contains no or only extremely little free sulfuric acid and its free $P_2O_5$ content is quite high.

Advantageously, the attack temperature may be comprised between 70 and 80° C. Preferentially, the free $P_2O_5$ concentration resulting from the attack step may be from 40 to 45% by weight.

The free $SO_3$ concentration of the acid aqueous phase of the first slurry may be from 0.1 to 0.4% by weight.

This first slurry is then directly subject, in its entirety to a conversion step which consists of heating it to a temperature above 90° C., preferably comprised between 90 and 105° C.

This heating produces in a known way solubilization of the gypsum crystals, release of the co-crystallized $P_2O_5$ in the gypsum during the attack step and recrystallization of calcium sulfate in the form of a hemihydrate.

Thus, a second slurry is obtained in a simple and easy way, in which the hemihydrate crystals have a spherical shape and are of a common size, for example having a $d_{50}$ of 60 µm, which gives a filtration cake having an excellent filtration coefficient.

The production acid has an extremely low free $SO_3$ content advantageously of the order of 0.05% to less than 1% by weight, which makes it a quality phosphoric acid. Advantageously it is possible to obtain a production phosphoric acid having a free $P_2O_5$ content from 35 to 45% by weight.

According to an embodiment of the invention, the step for heating the first slurry does not comprise any addition of sulfuric acid, However it may be contemplated that the method comprises, during the step for converting the first slurry, introduction of sulfuric acid into the latter. The added amount of sulfuric acid should however be metered specifically so that, after filtration of the second slurry, the production phosphoric acid contains a free $SO_3$ content of less than 2% by weight, preferably of the order of 0.05 to 1.5% by weight, in particular of the order of 0.05 to less than 1% by weight. It is important not to exceed this content so as not to contaminate phosphoric acid with sulfuric acid which would make it unsuitable for use as phosphoric acid and would require a desulfatation step.

According to a preferred embodiment of the invention, the method comprises the attack step in a first reactor, and a transfer of the first slurry from the first reactor to a second reactor, in which is carried out the conversion step with formation of the second slurry, the separation step being carried out on a filter. This method has the advantage of being able to be used in an existing installation for producing phosphoric acid by conventional attack with sulfuric acid. The first reactor is the attack reactor of the conventional installation, in which different attack conditions are applied. The second reactor is the ripening reactor of the conventional installation. As an enlargement of the gypsum grains resulting from the attack is not required according to the invention, this ripening reactor may be used as a conversion reactor. Finally, the filter of the conventional installation may be used for filtering hemihydrate instead of gypsum. This filter may be any suitable known filtration device, for example a band filter, a device with filtering cells arranged as a carrousel inter alia.

The method according to the invention is advantageously carried out continuously. Preferably, the dwelling time in the first reactor is from 2 to 4 h and the dwelling time in the second reactor is from 0.5 to 1.5 h. The dwelling times correspond to the dwelling times in the attack and ripening reactors of a conventional installation.

Other embodiments of the invention are indicated in the appended claims.

Other details and particularities of the invention will become apparent from the description given hereafter, in a non-limiting way, and with reference to the appended drawings.

Figure 1:
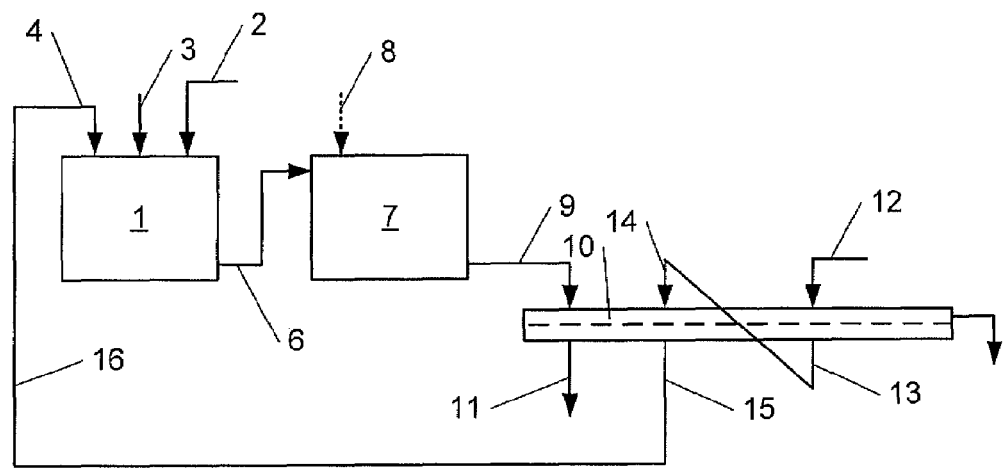
FIG. 1 illustrates as a flow diagram, an exemplary installation applying a method according to the invention.

The installation illustrated in FIG. 1 comprises an attack reactor 1 into which crushed phosphate rock is introduced in 2 and sulfuric acid in 3, for example sulfuric acid with a concentration of 98-99% by weight. An aqueous solution of phosphoric acid stemming from the method may advantageously be recycled in 4 into the reactor 1.

The applied operating conditions in this reactor are the following:
Temperature 70-80° C.
% of free $P_2O_5$: 38-50% by weight
% of free $SO_3$: 0.05%-<0.5% by weight
Dwelling time 2-4 h.

Unlike what is expected by one skilled in the art, dihydrate crystals are obtained.

Figure 2:
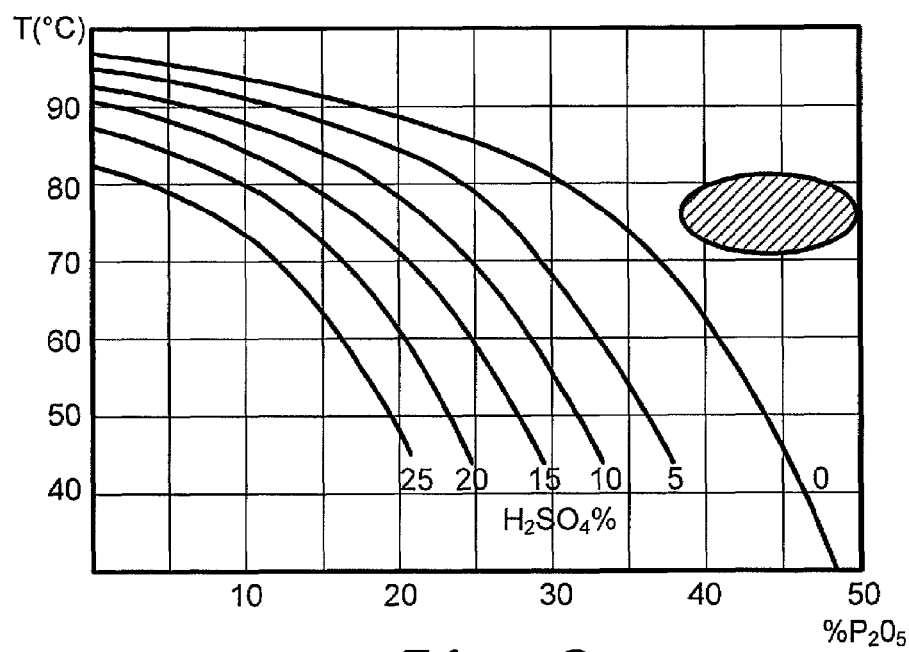
FIG. 2 is a graph illustrating dihydrate and hemihydrate formation regions versus temperature, $P_2O_5$ concentration and $SO_3$ concentration.
Figure 3:
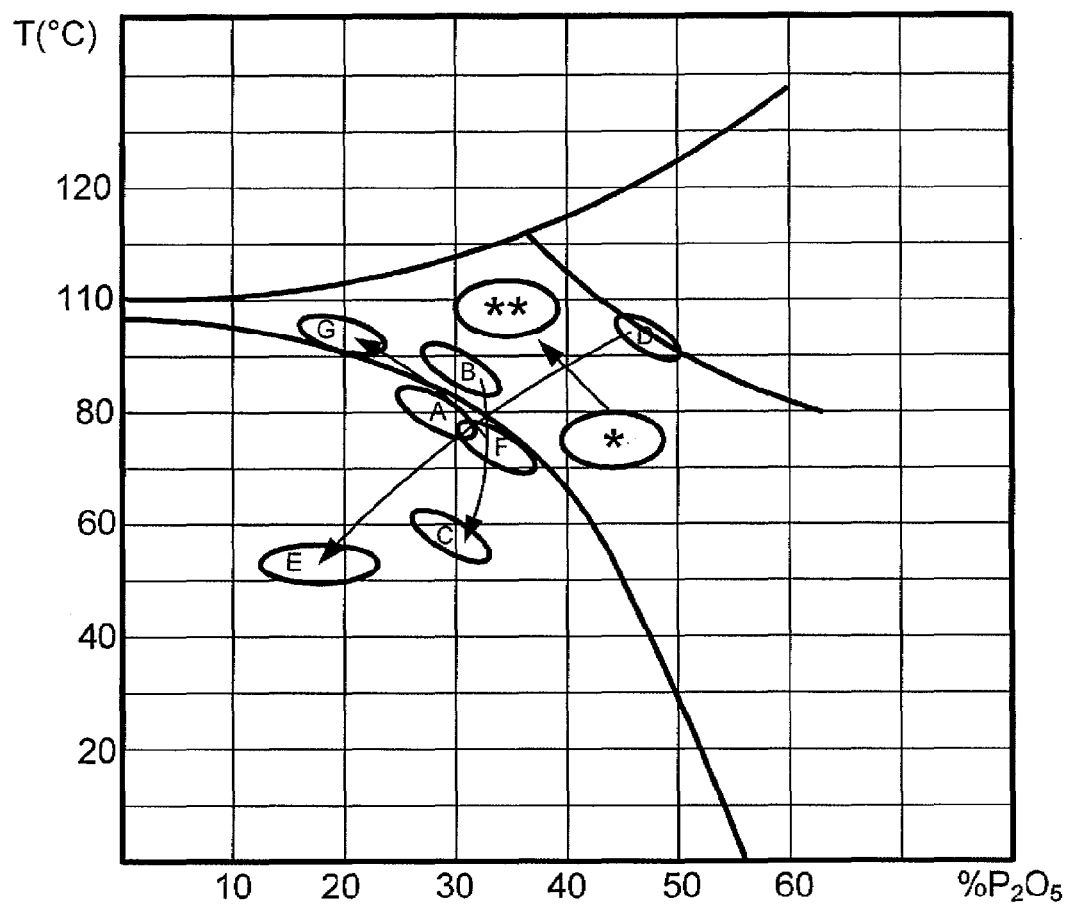
FIG. 3 is a graph which illustrates the different processes applied for producing phosphoric acid by sulfuric attack.

Indeed, FIG. 2 may now be consulted, The illustrated graph is extracted from A. V. Slack, Phosphoric Acid, Vol. 1, Part I, ed. Marcel Dekker Inc., 1968, New York. The temperature is indicated in ordinates, the $P_2O_5$ and $SO_3$ concentrations in abscissas, The curves represent the equilibrium between dihydrate and hemihydrate. The region of the graph located below these curves corresponds to the formation conditions of dihydrate, the one located above these curves to those for forming hemihydrate. The hatched ellipse represents the area meeting the preferential conditions of the attack according to the present invention. Unlike what is predicted upon examining this graph, a stable slurry of dihydrate crystals and not of hemihydrate crystals is obtained according to the invention.

The same conclusion may be drawn upon examining the graph extracted from P. Becker, Phosphates and Phosphoric Acid, $2^{nd}$ ed., Marcel Dekker Inc., 1989, New York—Basel. In this graph, the temperature is indicated in ordinates and the $P_2O_5$ concentration in abcissas. In the left lower corner of the graph is found the dihydrate formation region, in the right upper corner, the region for forming anhydrite and between the two, the region for forming the hemihydrate. The area A corresponds to the conditions of the conventional method with formation of gypsum. The areas B and C, connected by an arrow, and D and E connected by an arrow, correspond to the conditions of two methods first forming hemihydrate and then converting the latter into dihydrate. The areas F and G linked by an arrow represent the conditions of a method first forming dihydrate and then converting the latter into hemihydrate.

The ellipse marked by an asterisk meets the attack conditions according to the invention and the ellipse marked with two asterisks, linked to the first by an arrow, meets the conditions of the conversion according to the invention.

According to the general knowledge of one skilled in the art, the formation of hemihydrate may therefore be expected in both areas corresponding to these two ellipses, this is not the case and is already surprising in itself.

The totality of the gypsum slurry obtained in the reactor 1 is then transferred through the conduit 6, provided with transfer means known per se, to a conversion reactor 7. In this reactor, the following operating conditions are applied:
Temperature: 90-105° C.
% of $P_2O_5$: 35-45% by weight
% of $SO_3$: 0.1%-<1.0% by weight
Dwelling time : 0.5-1.5 h.

In order to heat this reactor, common means, for example direct heating, injection of steam into the conversion medium or a combination of both may be applied. Any other suitable heat source may of course be used for this purpose. Under the effect of the increase in heat, the gypsum crystals solubilize, the co-crystallized $P_2O_5$ is released and the calcium sulfate recrystallizes as relatively pure hemihydrate crystals.

According to an alternative method, it is possible in order to further improve the conversion of gypsum into hemihydrate, to add into the conversion reactor 7 a small metered amount of sulfuric add. However this amount should be such that the free $SO_3$ content in the production add is less than 2% by weight, preferably 1%. The production add cannot be contaminated by this addition of sulfuric add.

The illustrated method comprises a transfer of the slurry of reactor 7 through the conduit 9 to a filter 10 of a common type.

In a first section of the filter, a filtrate which is the production phosphoric add and a filtration cake are obtained in 11.

The illustrated method comprises two steps for washing the cake. The second washing is carried out by means of a washing liquid which preferably is water, supplied in 12.

The product obtained from this washing in 13 is an aqueous solution with a high phosphoric acid content which is used as a washing liquid supplied in 14 to the first washing step. The product of this first washing, obtained in 15, is an aqueous solution of phosphoric acid which may be recycled in 4 to the attack reactor 1, via a recycling conduit 16.

As compared with the so-called conventional method, the method according to the invention provides the advantage of an improved extraction yield, given the recrystallization, and production yield of an acid with a high $P_2O_5$ content, with a content of more than 35% by weight, instead of the 25 to 30% obtained with the conventional method. The dry hemihydrate cake is quite valuable in industry. Its stockpiling properties are excellent, since in the presence of water or humidity, the hemihydrate is reconverted into gypsum. These improvements are obtained in a simple way in an existing installation, without increasing the bulkiness thereof.

The method according to the invention will be described below in more detail by means of non-limiting exemplary embodiments.

EXAMPLE 1

A pilot test was conducted with a sedimentary phosphate from the Middle East containing 29.5% of $P_2O_5$, 45.3% of CaO, 3.2% of F, 3.8% of $CO_2$.

The grain size distribution of the crushed rock was close to the one generally used in phosphoric acid plants (1.1% passing at 500 μm, 48.8% passing at 150 μm and 70% passing at 75 μm).

The phosphate is introduced into the attack reactor with a volume of 30 liters, by a feeder screw and the flow rate (3.2 kg/h) is controlled by a weight loss system. Two metering pumps inject the sulfuric acid (2.5 kg/h) and the recycled acid (9.2 kg/h) from the washing of the filtration cake. The temperature is maintained constant, at the required value by means of a heating system.

The attack of the phosphate by sulfuric acid was carried out under the following conditions:
$P_2O_5$ content: 38.2% by weight
$SO_3$ excess: 0.45% by weight
Temperature: 76° C.
Solid content: 33% by weight The output flow rate of the attack pulp is about 9 l/h. The average dwelling time in the attack reactor (calculated as the ratio between the volume of the reactor and the output flow rate of the dihydrate slurry) is therefore of about 30 l/9 l/h=3.3 hours. Under these conditions, a stable slurry of small size dihydrate crystals ($d_{50}$ less than 20 μm) is obtained. These are mainly isolated crystals, but cross-shaped and star-shaped crystals are also observed. These crystals, which would have very poor filterability, are not filtered.

The gypsum slurry obtained during this first step is then heated up to 95° C. in a second reactor. A small addition of sulfuric acid (about 300 g/h) is performed in order to obtain the free $SO_3$ content of a normal phosphoric acid (1.3% by weight). Under these conditions, the recrystallization of the gypsum into hemihydrate was very easy. Crystals with a spherical shape and of normal size ($d_{50}$=60 μm) were obtained.

Filtration and washing tests were conducted on the hemihydrate slurry in order to determine the filtrate coefficient. The obtained coefficients are excellent (11.3 tonnes of $P_2O_5$ per day/m²).

The produced phosphoric acid contains 35.3% by weight of $P_2O_5$ and 1.3% by weight of free $SO_3$. The obtained filtration hemihydrate cake contains a total $P_2O_5$ content of 0.53% by weight which corresponds to a total $P_2O_5$ extraction yield (attack and filtration) of 97.9% by weight. The free water content of the hemihydrate cake is 22.5% and the crystallization water is 6.3% which actually confirms that this is a hemihydrate. After rehydration, the free water content falls to about 9.5%.

EXAMPLE 2

A slurry formed of calcium sulfate and of phosphoric acid in a weight titer of 50% of $P_2O_5$ and 0.15% of $SO_3$ is obtained by attack of a North African phosphate (30% of $P_2O_5$, 50.1% of CaO, 3.6% of F).

It is stable as a dihydrate when the temperature is 72° C.

Next, it is subject to an increase in temperature of 1° C./5 minutes. When the temperature reaches 100° C., the onset of the dihydrate/hemihydrate conversion is observed, characterized by a slight drop in temperature (endothermic process).

When the temperature reaches 102° C., the conversion is finished and the calcium sulfate hemihydrate is now in the stable form. The conversion is confirmed by observation of crystals under the microscope. The obtained phosphoric acid contains 48.2% of $P_2O_5$ and 0.14% of $SO_3$.

EXAMPLE 3

A slurry formed of calcium sulfate and of phosphoric acid with a weight titer of 41.6% of $P_2O_5$; 0.4% of $SO_3$; 0.24% of $Al_2O_3$; 0.99% of F is obtained by attack of a North African phosphate.

It is stable, at least for a period of 8 hours, as a dihydrate when the temperature is 78° C.

Next, it is subject to addition of sulfuric acid, in steps of 0.2%. When the $SO_3$ content in the liquid phase is 0.6%, both phases (dihydrate and hemihydrate) are stable and co-exist. When the $SO_3$ content in the liquid phase is 0.8% of $SO_3$, the conversion into hemihydrate is complete, the hemihydrate phase is now in the stable form. Conversion is confirmed by observation of crystals under the microscope, measurement of the crystallization water (6.18%) and X-ray diffraction (XRD).

It should be understood that the present invention is by no means limited to the embodiments described above and that many modifications may be made thereto within the scope of the appended claims.

The invention claimed is:

1. A method for producing phosphoric acid, comprising:
an attack in an aqueous medium of phosphate rock by means of sulfuric acid at a first temperature comprised between 70 and 90° C., with formation of a first slurry of calcium sulfate dihydrate crystals suspended in an acid aqueous phase, the acid aqueous phase of this slurry having a free $P_2O_5$ content comprised between 38 and 50% by weight and a free $SO_3$ content from 0.05 to 0.4% by weight, a conversion of this first slurry by heating to a temperature above 90° C., with solubilization of the calcium sulfate dihydrate crystals and recrystallization of the solubilized calcium sulfate giving rise to a second slurry formed of hemihydrate calcium sulfate crystals suspended in an aqueous phase based on phosphoric acid, and a separation in the second slurry between a production phosphoric acid, having a free $SO_3$ content of less than 2% and greater than 0.05% by weight, and a $P_2O_5$ content from higher than 35% to 45% by weight, and a filtration cake based on calcium sulfate hemihydrate.

2. The method according to claim 1, characterized in that the obtained production phosphoric acid has a free $SO_3$ content of the order of 0.05 to 1.5% by weight.

3. The method according to claim 1, comprising introducing sulfuric acid into the first slurry during the step for conversion.

4. The method according to claim 1, characterized in that the step for heating the first slurry does not comprise any addition of sulfuric acid.

5. The method according to claim 1, characterized in that it comprises the attack step in a first reactor, and a transfer of the first slurry of the first reactor to a second reactor in which is carried out the conversion step, with the formation of the second slurry, the separation step being carried out on a filter.

6. The method according to claim 5, characterized in that the heating of the first slurry takes place by direct heating of the second reactor.

7. The method according to claim 5 comprising a dwelling time in the first reactor from 2 to 4 hours and a dwelling time in the second reactor from 0.5 to 1.5 hour.

8. The method according to claim 1, characterized in that it further comprises at least one step for washing the filtration cake with a washing liquid, with a phosphoric washing product being obtained.

9. The method according to claim 8, characterized in that it further comprises recycling of the phosphoric washing product stemming from at least one aforesaid washing step to the attack step.

10. The method according to claim 1, characterized in that the method is carried out continuously.

11. The method according to claim 5, characterized in that the heating of the first slurry takes place by injecting steam into the second slurry.

12. The method according to claim 5, characterized in that the heating of the first slurry takes place by direct heating of the second reactor and injecting steam into the second slurry simultaneously.

* * * * *